United States Patent
Lenihan et al.

(10) Patent No.: US 11,281,477 B2
(45) Date of Patent: Mar. 22, 2022

(54) ASSIGNING COMPUTING RESOURCES TO EXECUTION OF EVALUATORS FOR IMAGE ANIMATION

(71) Applicant: Weta Digital Limited, Wllington (NZ)

(72) Inventors: Niall J. Lenihan, Wellington (NZ); Richard Chi Lei, Wellington (NZ); Sander van der Steen, Wellington (NZ)

(73) Assignee: WETA DIGITAL LIMITED, Wellington (NZ)

( * ) Notice: Subject to any disclaimer, the term of this patent is extended or adjusted under 35 U.S.C. 154(b) by 0 days.

(21) Appl. No.: 17/379,996

(22) Filed: Jul. 19, 2021

(65) Prior Publication Data
US 2022/0027172 A1    Jan. 27, 2022

Related U.S. Application Data

(60) Provisional application No. 63/056,454, filed on Jul. 24, 2020, provisional application No. 63/214,729, filed on Jun. 24, 2021.

(51) Int. Cl.
| | |
|---|---|
| *G06F 9/445* | (2018.01) |
| *G06F 8/41* | (2018.01) |
| *G06F 9/451* | (2018.01) |
| *G06F 9/50* | (2006.01) |

(52) U.S. Cl.
CPC ............ *G06F 9/44526* (2013.01); *G06F 8/44* (2013.01); *G06F 9/451* (2018.02); *G06F 9/5011* (2013.01); *G06F 9/5027* (2013.01)

(58) Field of Classification Search
CPC .................................................. G06F 9/44526
See application file for complete search history.

(56) References Cited

U.S. PATENT DOCUMENTS

| | | | | |
|---|---|---|---|---|
| 7,082,521 B1 * | 7/2006 | Nanja | .................. | G06F 9/5061 713/1 |
| 9,110,725 B1 * | 8/2015 | Nanja | ................. | H04L 41/0806 |

OTHER PUBLICATIONS https://www.indefiant.com—Indefiant Recode—5 pages.
https://www.liveplusplus.tech—Live++—7 pages.

* cited by examiner

*Primary Examiner* — Charlie Sun
(74) *Attorney, Agent, or Firm* — Trellis IP Law Group, PC

(57) ABSTRACT

An example method facilitates adjusting or enhancing performance of a process of as graphics program or animation software package, and includes providing a first User Interface (UI) control for allowing user assignment of or selection of one or more processor types, e.g., Graphics Processing Unit (GPU) or Central Processing Unit (CPU), and/or associated memory types, e.g., GPU memory and/or CPU memory, to one or more computing resources, such as variables and/or associated functions or evaluators. A dropdown menu or other control may be provided in a first UI to allow for user specification of or assignment of one or more computing resources, e.g., CPU or GPU processors and/or memory to one or more variables, data structures, associated functions or other executable code. In a specific implementation, one UI control facilitates user specification of one or more evaluators of a plugin, wherein the one or more evaluators are usable by a host application of the plugin. A second UI control enables user specification of whether or not the one or more evaluators should use data on a CPU or GPU.

18 Claims, 8 Drawing Sheets

ASSIGNING COMPUTING RESOURCES TO EXECUTION OF EVALUATORS FOR IMAGE ANIMATION

CROSS REFERENCES TO RELATED APPLICATIONS

This application claims the benefit of the following application, U.S. Provisional Patent Application Ser. No. 63/056,454, entitled METHODS AND SYSTEMS FOR OPERATING ANIMATION CONTROLS AND CONSTRUCTING EVALUATION LOGIC, filed on Jul. 24, 2020 (WD0059PP1), which is hereby incorporated by reference as if set forth in full in this application for all purposes.

This application further claims the benefit of U.S. Provisional Patent Application Ser. No. 63/214,729, entitled ASSIGNING COMPUTING RESOURCES TO EXECUTION OF EVALUATORS OF IMAGE ANIMATION, filed on Jun. 24, 2021 (WD0059PP2), which is hereby incorporated by reference as if set forth in full in this application for all purposes.

This application is further related to the following application, U.S. patent application Ser. No. 17/379,992, entitled FORCED CONTIGUOUS DATA FOR EXECUTION OF EVALUATION LOGIC USED IN ANIMATION CONTROL, filed Jul. 19, 2021 (WD0059US1), which is hereby incorporated by reference as if set forth in full in this application for all purposes.

FIELD

The present disclosure generally relates to systems, methods, and User Interfaces (UIs) for operating computer graphics software, such as animation software, and more specifically to functionality and UIs afforded by plugins or add-ins to host graphics software.

BACKGROUND

Graphics software is employed in various demanding applications, including special effects for the movie industry, gaming, computer-aided design, and so on. Such applications often demand user-friendly, feature-rich, flexible software that can rapidly perform complex operations.

Graphics software, such as animation software, may provide users with functionality for performing operations, such as scaling, rotating, etc., on a given displayed object. However, such functionality can be limited, and code used to implement such operations can be sub-optimal.

SUMMARY

Various implementations discussed herein provide a system, framework, and Integrated Development Environment (IDE) that can act as a plugin or add-in to a host application, such as graphics software, so as to extend functionality, flexibility, and performance thereof.

Components of the plugin are organized into modules, also called computing objects herein, which facilitate optimal storage in memory during execution. The modules may be nested and may intercommunicate as needed. Functionality is also provided for facilitating code re-use and sharing, dynamic updating of functionality of the host application, control over versions of functions or evaluators that are used for particular operations in the host application, extensibility, and dynamic compilation of plugin code, such that modified plugin code can be patched into the host application during runtime, without the need to restart the host application.

In a more specific implementation, a User Interface (UI of the plugin) provides one or more UI controls allowing computing resource assignments, e.g., Central Processing Units (CPUs), Graphics Processing Units (GPUs) and/or associated memories to one or more variables (and/or arguments), functions, data structures, executable code, etc. For instance the UI may provide user options to assign a variable, data structure, function, or other element of code to a computing resource.

One example method represents a method for affecting performance of a process implementing an operation pertaining to a computer graphics operation, and includes providing a first user option, via a Graphical User Interface (GUI), to assign a variable, data structure, or other argument of a function or more computing resources; and using the one or more computing resources to implement a function that takes as input the variable or argument, wherein the function pertains to a process used by a plugin or add-in to a computer graphics program.

The one or more computing resources may include a GPU memory. The one or more computing resources may further include one or more evaluators or functions. The one or more variables may represent one or arguments to a function or evaluator, which may also be selected in the UI via one or more UI controls. The one or more variables may include a data structure, such as a compound data structure that includes sub-data structures.

In an illustrative implementation, another example method facilitates augmenting functionality of a host application, such as graphics program or animation software package, via a plugin that includes a UI that provides a first UI control for specifying one or more evaluators of a plugin, wherein the one or more evaluators are usable by the host application; providing a second UI control enabling user specification of whether or not the one or more evaluators should run on a CPU or GPU and/or use arguments or variables stored thereon; providing a third UI control enabling a user to initiate dynamic interpretation of (and/or compilation of) code implemented by the plugin, resulting in interpreted code, while the host application is running; and employing the host application to use the interpreted/compiled code.

In a more specific implementation, the method further includes storing data used by the plugin in a block of contiguous memory, via a flat file that includes one or more flattened nested computing objects (also called modules herein). Each module may include one or more evaluators and one or more data descriptions. The data descriptions describe arguments, i.e., data, which the evaluators are to receive as input.

The plugin may further include functionality for enabling code reuse and sharing by other users of the plugin. An integration module, which may be implemented via one or more Application Programming Interfaces (APIs) facilitates integrating the plugin with the host application.

The first, second, and third UI controls are incorporated into a GUI that is part of an IDE. The GUI includes one or more UI controls for facilitating user selection of one or more different versions of one or more evaluators. The GUI further includes one or more UI controls for enabling a user to direct code to be maintained in contiguous memory associated with the CPU or the GPU.

A further understanding of the nature and the advantages of particular implementations disclosed herein may be realized by reference of the remaining portions of the specification and the attached drawings.

BRIEF DESCRIPTION OF THE DRAWINGS

Various implementations in accordance with the present disclosure will be described with reference to the drawings, in which:

FIG. 1 shows an example integrated system, including a host application that is integrated with a plugin that provides rapid computing functionality, extensibility (e.g., via Integrated Development Environment (IDE) functionality), dynamic interpretation/compilation features, code reuse, distribution, and sharing, and so on.

FIG. 2 shows an example framework used by the plugin of FIG. 1 to facilitate the rapid computing functionality, extensibility, dynamic interpretation/compilation features, code reuse, distribution, and sharing, and so on.

DETAILED DESCRIPTION

In the following description, various implementations will be described. For purposes of explanation, specific configurations and details are set forth in order to provide a thorough understanding of the implementations. However, it will also be apparent to one skilled in the art that the implementations may be practiced without the specific details. Furthermore, well-known features may be omitted or simplified in order not to obscure the implementation being described.

For the purposes of the present discussion, a computing environment may be any collection of computing resources used to perform one or more tasks involving computer processing. A computer may be any processor in communication with a memory.

A computing resource may be any component, mechanism, or capability or quantities thereof of a computing environment, including, but not limited to, processors, memories, software applications, user input devices, and output devices, servers, data, and so on.

A variable may be any data container for holding data that may vary. A variable name may be any information that can be used by a computer process to reference the variable and extract data therefrom.

A data structure may be any collection or organization of data and/or functionality. This may include computing objects, programming language classes, enumerated types, arrays, compound data structures, and so on. A compound data structure may be any hierarchical arrangement of or nesting of inter-related data structures.

An argument may be any input to a function, procedure, or other computer process. An argument description may be any information describing one or more inputs to the function, procedure, and/or other computer process. Accordingly, a variable may be provided as an argument to a given function, procedure and/or other computer process.

An evaluator may be any function, procedure, and/or other computer process that takes one or more arguments as input and provides one or more outputs. Generally, in the context herein, evaluators pertain to functions used by computer graphics programs.

A computer graphics program may be any software program or suite of programs (e.g., a software package) that is adapted to facilitate adjustment and/or control of visually displayed items, e.g., items presented on a computer monitor and/or other display device (e.g., television, etc.). Accordingly, animation software used to generate animations for movies, games, videos, and so on, represents a type of computer graphics software.

For clarity, certain well-known components, such as the Internet, hard drives, processors, power supplies, routers, Internet Service Providers (ISPs), middleware, and so on, are not necessarily explicitly called out in the figures. However, those skilled in the art with access to the present teachings will know which components to implement and how to implement them to meet the needs of a given implementation.

Figure 1:
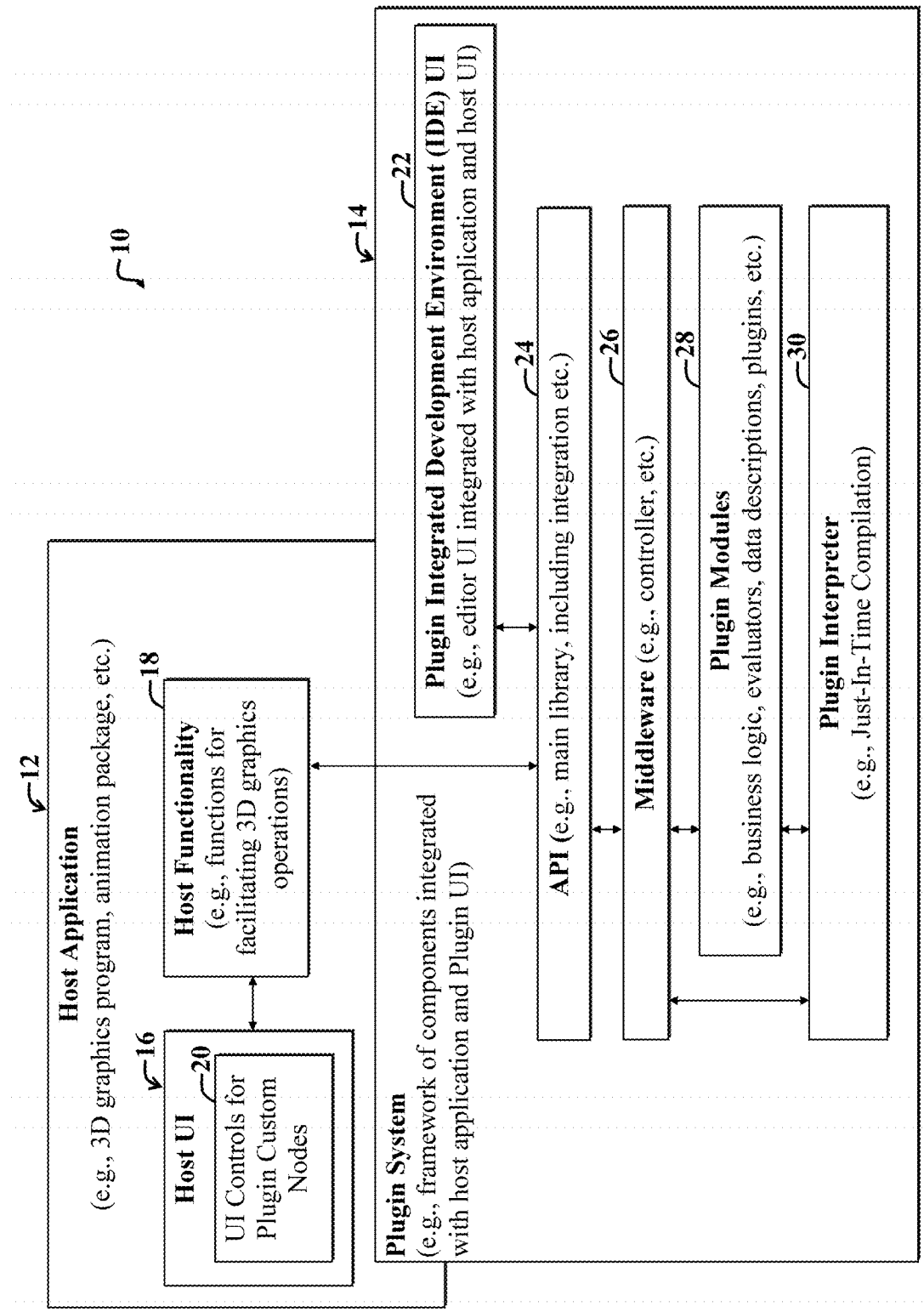

FIG. 1 shows an example integrated system 10, including a host application 12 that is integrated with a plugin 14 (also called plugin system or add-in herein) that provides rapid computing functionality, extensibility (e.g., via Integrated Development Environment (IDE) functionality), dynamic interpretation/compilation features, code reuse, distribution, and sharing, versioning control (e.g., for assigning different versions of plugin modules 28 for use by and/or with host functionality 18, as discussed more fully below), and so on.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, while evaluators 40, 42, 76 are shown separately from a first plugin module or file 40, they may alternatively or additional be shown as part of the same plugin module 40, without departing from the scope of the present teachings.

The example host application includes a host UI 16 with accompanying host UI controls 20 for accessing functionality afforded by the plugin 14. The host application 12 is integrated with the host application 12, as discussed more fully below.

The host application 12 includes host functionality 18, such as functions for facilitating 3D graphics and/or animation applications. The host functionality 12 is integrated with and selectively uses (e.g., responsive to user manipulation of the host UI controls) functionality provided by the plugin 14.

The plugin includes a technology stack, including an Application Programming Interface (API 24), which includes functionality for facilitating integrating the host application with various functional modules 22-30 of the plugin 14. The plugin 14 is implemented via a technology stack that includes the API 24, middleware 26 (e.g., a controller), plugin modules 28 (e.g., computing objects), and an interpreter 30. Various modules of the plugin 14 may intercommunicate, e.g., via the middleware 26.

An Integrated Development Environment (IDE) 22 also communicates with the API 24, and includes functionality for leveraging the middleware 26, plugin modules 28, and plugin interpreter 30 to enable users to not only create new plugin modules 28, use existing plugin modules 28, and dynamically compile them using the plugin interpreter 30.

During dynamic compilation, changes made to code (e.g., corresponding to the plugin modules, data, and/or data descriptions of the plugin 30 may be patched into the host application 12, while the host application 12 is running, i.e., during runtime. This obviates the need to restart the host application 12, when changes are made to the code and/or computing objects (e.g., modules 28) of the plugin, e.g., via use of the IDE 22.

Figure 2:
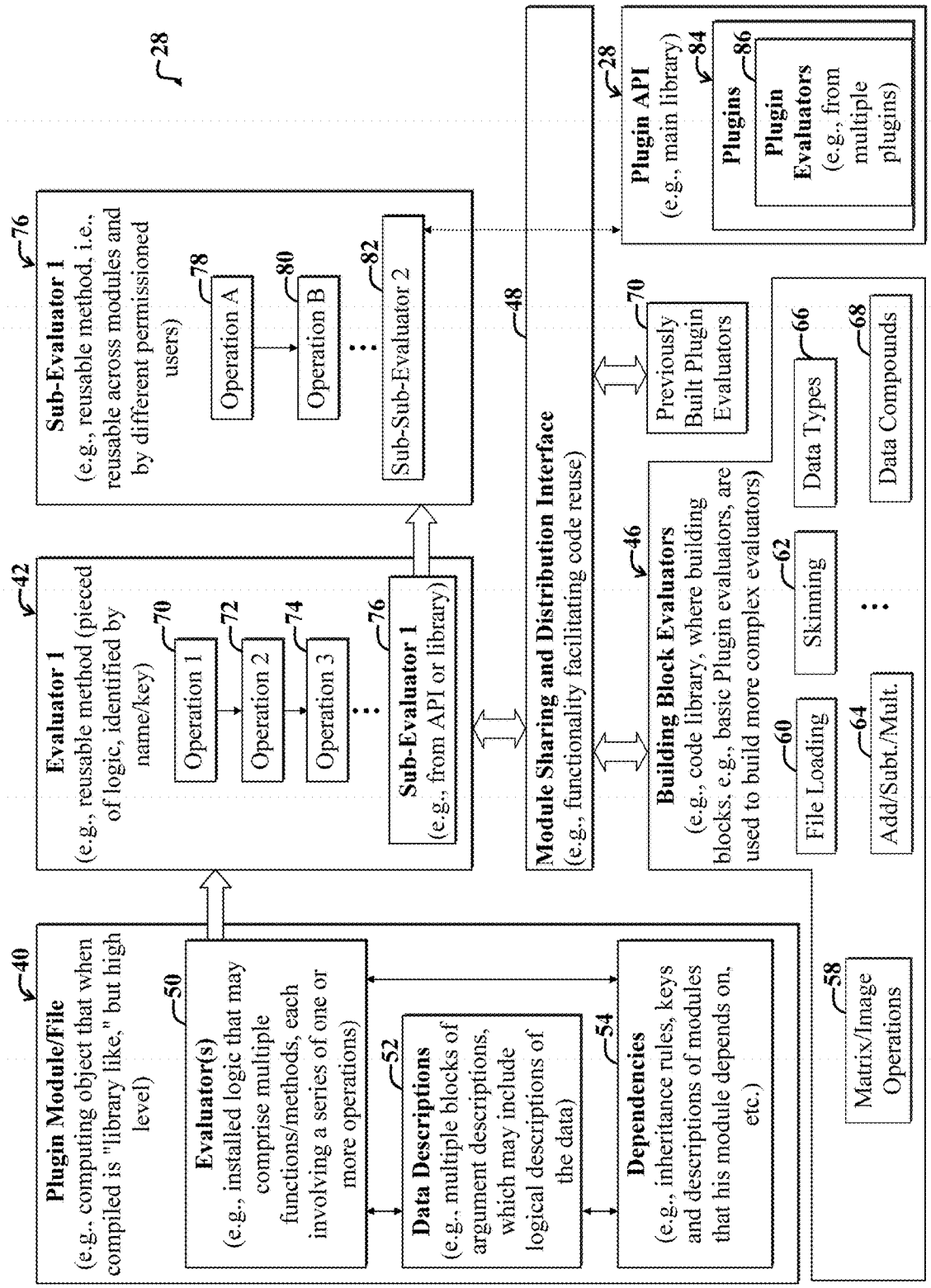

FIG. 2 shows an example framework for plugin modules 28 used by the plugin 14 of FIG. 1 to facilitate the rapid computing functionality, extensibility, dynamic interpretation/compilation features, code reuse, distribution, and sharing, and so on. During implementation, data and/or logic of the plugin modules 28 (also called add-in modules) may be interpreted and compiled into one or more flat files and stored in a block of contiguous memory, as discussed more fully below.

The example plugin modules 28 include a first plugin module 40 (also called file or computing object herein). The first plugin module 40 includes evaluators 50, also called functions. The evaluators are associated with data descriptions 52, which describe or characterize inputs to (also called arguments herein) the evaluators 50. The evaluators 50 may each include one or more operations, where an operation may also call another evaluator, as discussed more fully below.

The first example plugin module 40 further includes a specification of dependencies 54. The dependencies may indicate inheritance rules between different plugin modules and my include descriptions of modules that the current plugin module 40 depends upon or calls, e.g., to facilitate implementing the evaluators 50.

In the present example implementation, one or more of the evaluators 50 call a first evaluator 42. The first example evaluator 42 includes code for implementing various operations 70-74, in addition to a first sub-evaluator 76.

The first example sub-evaluator 76 also includes different operations 78, 80. The first example sub-evaluator 76 also includes a second sub-evaluator 82. The second sub-evaluator 82 leverages one or more plugin evaluators 86 of plugins 84 to the plugin system 14 of FIG. 1. The second sub-evaluator 82 may access, e.g., call, the plugin evaluators 86 via use of a plugin API 28, which facilitates enabling the evaluators 50, 42, 76 to be further extended via other plugins 86.

Code of the various plugin modules 28 can leverage underlying basic building block evaluators 46, so as to build more complex evaluators. Examples of basic building block evaluators include modules and associated code and functionality for implementing matrix and/or image operations 58, file loading 60, addition, subtraction and multiplication 64, and so on.

For illustrative purposes, the building block evaluators 46 are shown including descriptions of data types 66 and data compounds 68. Note that data compounds 68 may be relatively complex data types that may be defined to include one or more constituent data types.

Furthermore, note that previously built plugin evaluators 70, and/or other types of evaluators may be made available to other plugin modules 40, 42, 76 via a module sharing and distribution interface 48. The module sharing and distribution interface 48 implements functionality for facilitating code reuse and sharing.

For instance, users employing the plugin IDE 22 of FIG. 1 may augment the overall plugin system 14 with additional functionality, which may then be made available and selectively distributed to other users of the plugin system 14 of FIG. 1, via the module sharing and distribution interface 48 of FIG. 2.

Figure 3:
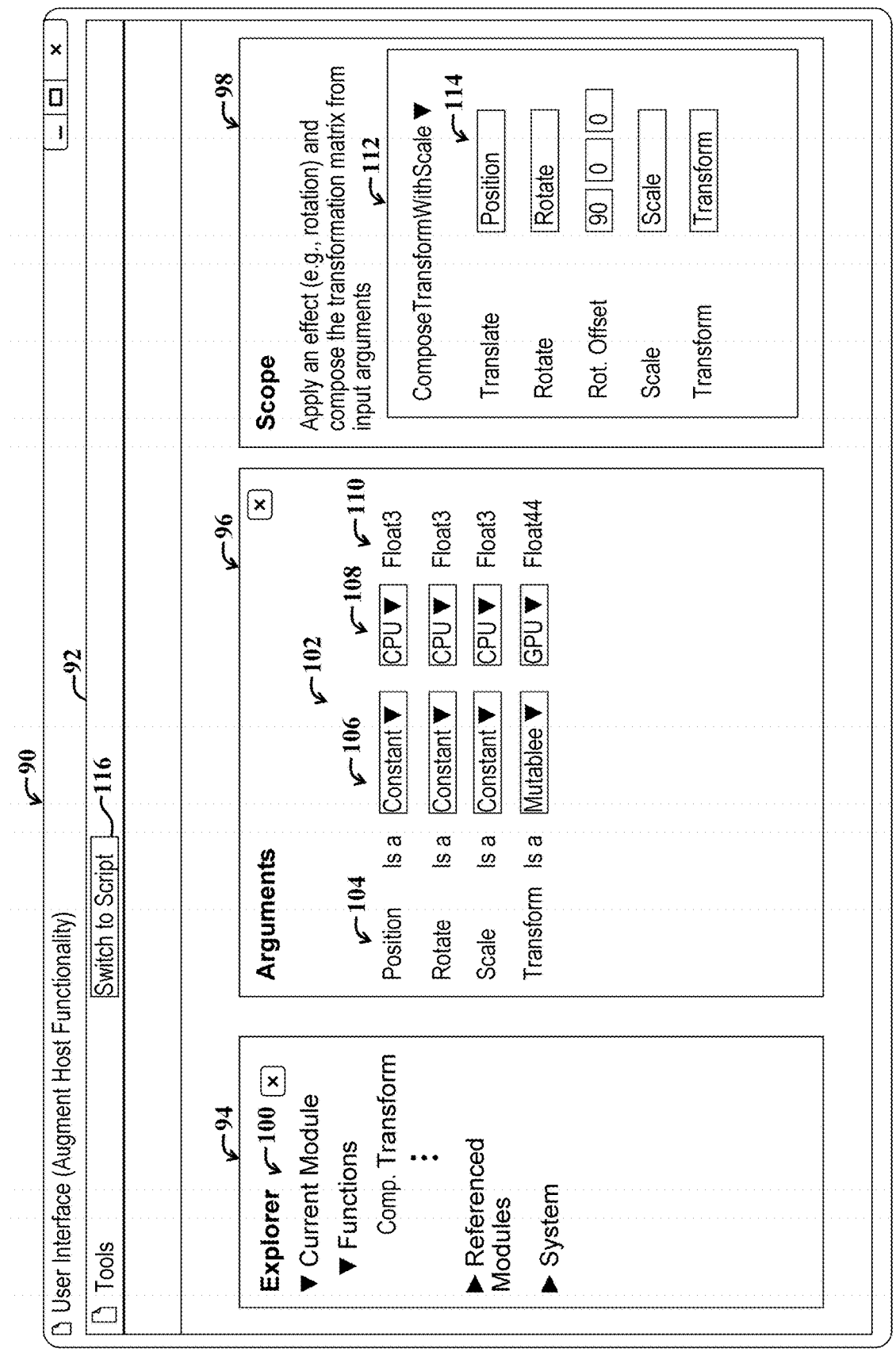
FIG. 3 shows a first example User Interface (UI) display screen with user options to assign different processes, functions, and/or operations or associated data or arguments to run on a Central Processing Unit (CPU) and/or Graphics Processing Unit (GPU) and/or using different memories or other computing resources associated therewith.

FIG. 3 shows a first example User Interface (UI) display screen with user options to assign different processes, functions, and/or operations or associated data or arguments to run on a Central Processing Unit (CPU) and/or Graphics Processing Unit (GPU) and/or using different memories or other computing resources associated therewith.

The example first UI display screen 90 includes a toolbar 92, which includes a script button 116, enabling a user to switch to another UI, whereby the user may hand-code plugin modules (e.g., the modules 40, 42, 76 84) of FIG. 2; then dynamically compile them for use by the host application 12 of FIG. 1.

The first example UI display screen further includes an explorer section 94, an argument section 96, and a scope section 98.

The explorer section includes various user options 100, enabling a user to select one or more functions or evaluators for which to adjust arguments thereof, e.g., via the arguments section 96.

The arguments section includes descriptions of different operations 104. Descriptions of the operations 104 may be further adjusted via one or more drop-down menu controls 106, e.g., to specify what type of argument that a particular operation will take.

Additional CPU/GPU selection controls 108 provide user options to selectively assign different functions and/or operations to run on a CPU or a GPU, when both CPUs and GPUs are available. Additional indicators 110 further characterize the data types of input arguments 102 for a function that has been selected in the explorer section 94, e.g., from among various UI controls 100 of the explorer section 94.

The scope section 98 provides a section 112 with various example fields 114 to enable a user to adjust parameters that will be used by a function selected in the explorer section 94.

Figure 4:
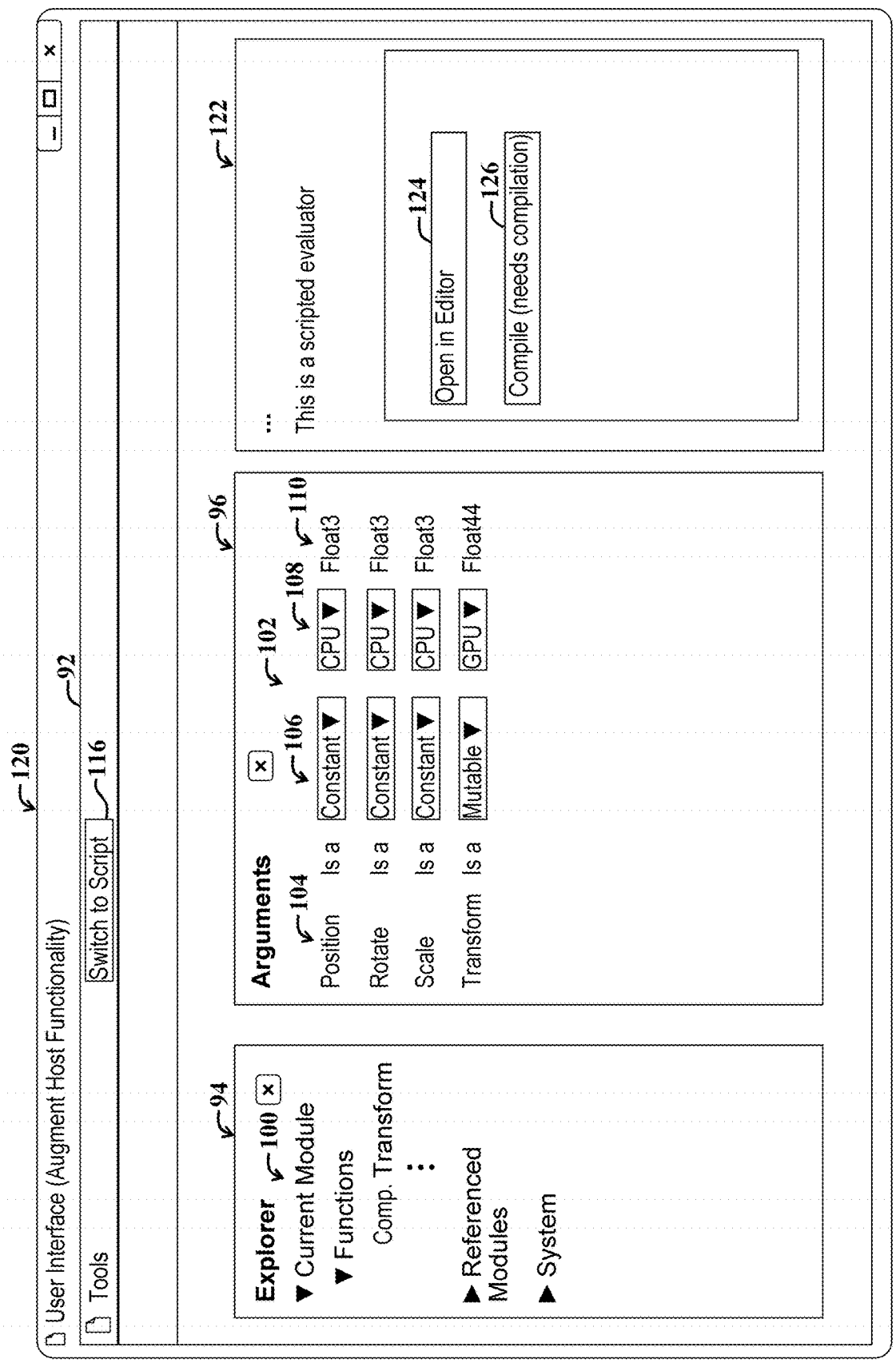
FIG. 4 shows a second example UI display screen with user options to initiate dynamic interpretation or compilation of code that is modified via or written via functionality afforded by the plugin of FIG. 1.

FIG. 4 shows a second example UI display screen 120 with various user options 122, 124, shown in a scope section 120 to initiate dynamic interpretation or compilation of code that is modified via or written via functionality afforded by the plugin of FIG. 1.

The second example UI display screen 120 of FIG. 4 is similar to the first UI display screen of FIG. 3, but wherein the scope section 112 of FIG. 3 is replaced by an updated scope section 122 in FIG. 4.

The updated scope section 122 may appear after a user has made modifications to an evaluator, e.g., an evaluator selected via the explorer section 94. The user may have also handwritten code, e.g., via a UI that may be displayed after user selection of a script button 16.

When code should be compiled before use, a compile button 126 appears in the UI display screen 120. A user may select the compile button 126 to initiate dynamic compilation, e.g., Just-In-Time (JIT) compilation. The resulting compiled code may then be patched into (and used by) the live running host application 12 of FIG. 1.

An example editor button 124 provides a user option to open the code associated with the current evaluator in another editor window, whereby a user may hand code or otherwise make further adjustments to the code for a particular evaluator, operation, or function before compilation.

Note that while various implementations discussed herein involve storage of collapsed computing objects in contiguous blocks of memory (e.g., RAM and/or cache) that are directly accessible to a processor, e.g., a CPU and/or GPU, implementations are limited thereto.

For instance, in certain implementations, so-called "swap files" on local hard drive storage (e.g., Solid State Drives (SSDs)) can be used to mimic the functionality of RAM. Furthermore, in certain implementations, user selection of CPU memory versus GPU memory for assignment of variables (e.g., arguments) for use by functions or evaluators running on the respective CPUs and/or GPUs may be further augmented with options to select and/or assign computing resources that are remotely coupled via a network.

For instance, in certain implementations, a particular function may be assigned to a remote computer that is coupled to a network with which the computer running the current process is coupled. The current process may call that particular function, which may run on a remote computer, and which may return a result to the current process.

Figure 5:
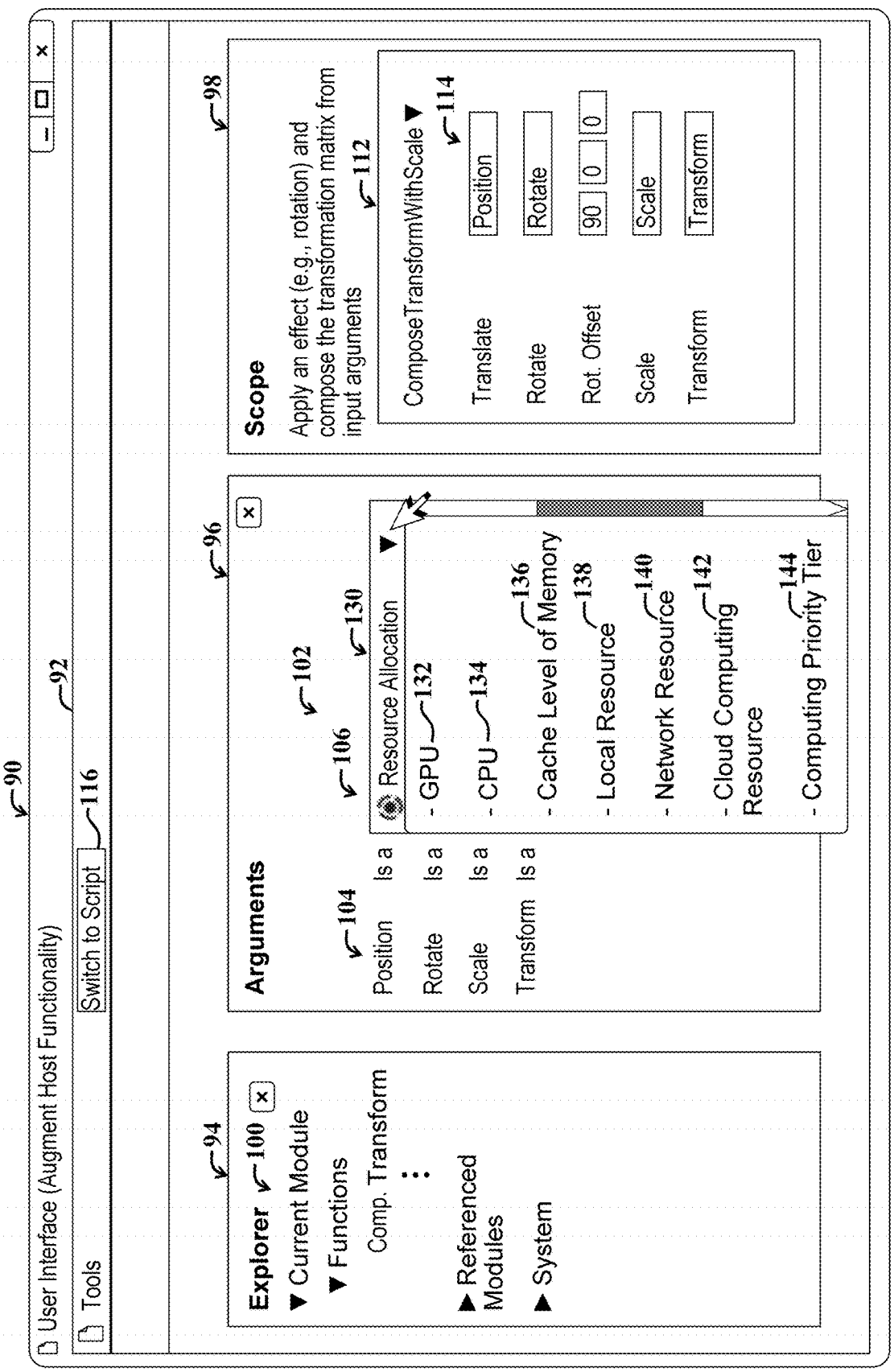
FIG. 5 shows a third example UI display screen illustrating additional example user options to assign different computing resources to an argument for use by an evaluator or function.

FIG. 5 shows a third example UI display screen illustrating additional example user options (i.e., UI controls) 132-144, via a drop down menu 130 to assign different computing resources to arguments for use by an evaluator or function.

In the example of FIG. 5, the drop-down menu 130 shows a first GPU UI control 132 for assigning a position argument to leverage a memory, process, and/or other computing resource associated with a GPU.

A second CPU UI control 134 provides a user option to assign the position argument (and/or other arguments and/or associated operations 104) to a CPU memory and/or processor.

A third UI control 136 provides a user option to assign a cache level of memory (e.g., level 1 cache, level 2 cache, level 3 cache, etc.) for use by a process associated with one or more of the arguments 96.

A fourth UI control 138 provides a user option to select a different local computing resource, e.g., processor, memory, etc., that may be associated with a particular computer (machine) upon which the current UI display screen 90 is running. For instance, an argument may be fed to a process via a solid state drive, a local swap file, etc.

A fifth UI control 142 provides a user option to leverage a cloud computing resource, e.g., cloud-based memory, a cloud-based processor and/or network, and so on, for use by a particular argument, data structure, and/or associated process, e.g., a selected process of which may be indicated in the explorer panel 94.

A sixth UI control 144 provides a user option to assign a computing priority tier for use by an argument, data structure, and/or associated process. A computing priority tier may be any level of organization of or grouping of computing resources, which may be local and/or remote.

Note that user selection of one or more of the UI controls 132-144 may trigger display of additional menus with additional UI controls for further specifying assignments of computing resources, e.g., data structures, for use by processes leveraging the associated computing resources.

Furthermore, note that in certain implementations, assignments of computing resources to certain arguments or operations 104 among the arguments 96 may be rejected by underlying software controlling the UI display screen 90, e.g., if an associated process selected in the explorer panel 94 is incompatible with the associated selected computing resource (e.g., selected via the drop-down menu 130) among the arguments 96.

Figure 6:
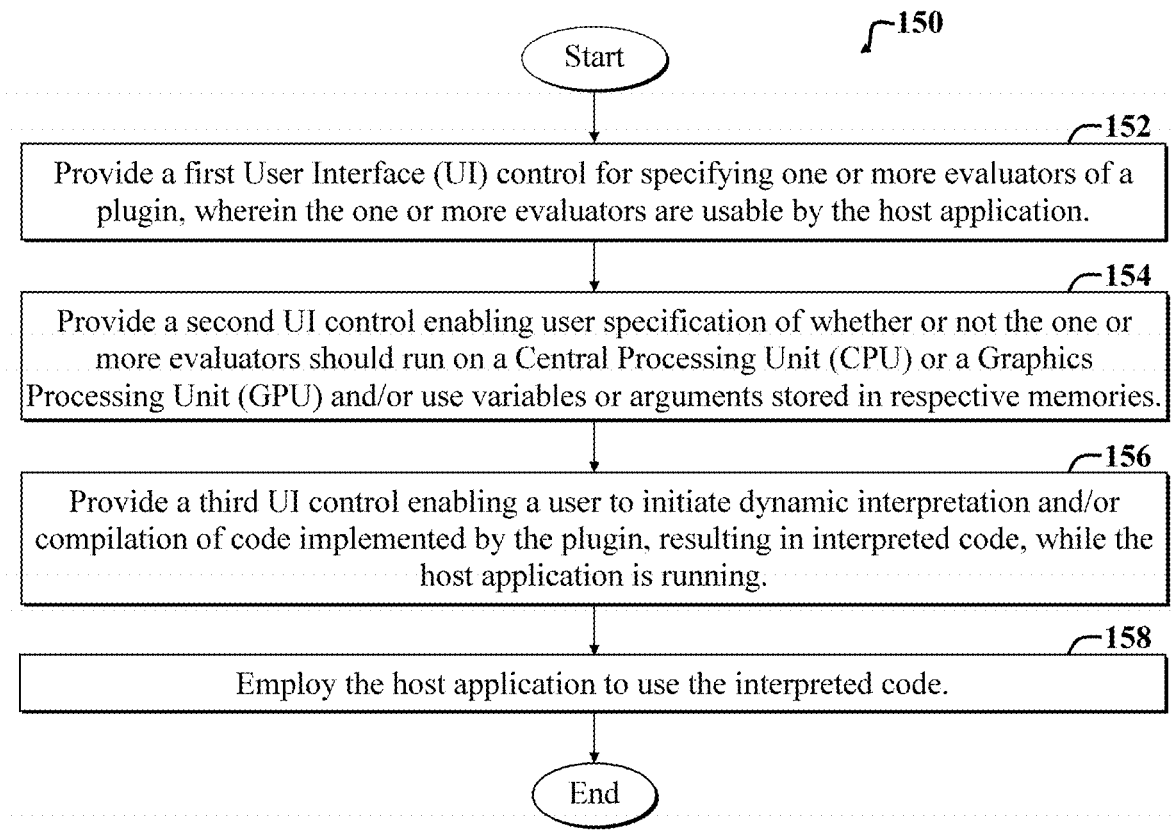
FIG. 6 shows an example method usable by the implementations of FIGS. 1-4.

FIG. 6 shows an example method 150 usable by the implementations of FIGS. 1-5. The example method 150 represents a method for facilitating augmenting functionality of a host application, e.g., the host application 12 of FIG. 1, wherein the host application represents a graphics program or animation software package.

The example method 150 includes a first step 152, which includes providing a UI control (e.g., one or more of the UI controls 100 of FIGS. 3 and 4) for specifying one or more evaluators of a plugin, wherein the one or more evaluators are usable by the host application.

A second step 154 includes providing a second UI control (e.g., one or more of the controls 108 of FIGS. 3 and 4) enabling user specification of whether or not the one or more evaluators should run on a Central CPU or a GPU and/or employ one or more variables or arguments (e.g., which may represent one or more different data types), which a user may assign to CPU and/or GPU memories.

A third step includes providing a third UI control (e.g., corresponding to the compile button 126 of FIG. 4) enabling a user to initiate dynamic interpretation of code implemented by the plugin, resulting in interpreted code usable by the host application, while the host application is running.

Note that the example method 150 may be modified or augmented, without departing from the scope of the present teachings. For example, the method 150 may further specify a step of storing data used by the plugin in a contiguous memory block, e.g., a block of Random Access Memory (RAM).

The contiguous memory block may be allocated to a flat file that may include data and/or code of the plugin.

The example method 150 may further specify using one or more nested computing objects or modules, e.g., as shown in FIG. 2, to implement data and code of the plugin. The one or more nested computing objects may include one or more evaluators and one or more data descriptions.

The plugin may further include functionality (e.g., corresponding to the module sharing and distribution interface 48 of FIG. 2) for enabling code sharing and reuse by other users of the plugin.

The example method 150 may further specify use of an integration module (e.g., corresponding to the API 24 of FIG. 1) for integrating the plugin with the host application, wherein the integration module is adapted to work with different types of host applications.

The example method 150 may further specify use of an IDE (e.g., represented by the GUI display screens 90 and 120 of FIGS. 3 and 4, respectively) to facilitate user selection of one or more different versions of evaluators and/or operations (e.g., via UI controls 100 of FIGS. 3 and 4) for use by a particular host application rendering and/or process.

Another example method for affecting, e.g., improving, performance of a process implementing an operation pertaining to a computer graphics operation includes providing a first UI control, via a Graphical User Interface (GUI) to assign a variable to one or more computing resources; and using the one or more computing resources to implement a function (e.g., an evaluator) that takes as input the variable, wherein the function pertains to a process used by a plugin to a host application.

The one or more computing resources may include a GPU memory and/or CPU memory. The one or more computing resources may further include an evaluator that implements a process implemented by a plugin to a host application.

The host application may include or represent a computer graphics program. The computer graphics program may include an animation software program. An example of an animation software program includes Maya®. The process may represent the process implements a process for affecting an animation control rig in a UI of the animation software program, e.g., scaling, skinning, rotating, etc. a displayed object in a UI of the animation software program.

The one or more invariables may include a data structure, such as a compound data structure. The compound data structure may represent a nested data structure, with one or more different data types with in the data structure. The first UI control may represent a user option to assign one or more variables for use by one or more GPUs or CPUs in associated with the function.

Another example method for executing a function to animate an animation control rig in computer graphics application includes the following steps: accepting a first signal from a user input device to select a data structure displayed in a Graphical User Interface (GUI); accepting a second signal from the user input device to assign the data structure to one or more computing resources; indicating in the GUI that the data structure has been assigned to the one or more computing resources; and using the one or more computing resources to implement the function's accessing of the data structure by using the one or more computing resources, wherein the function pertains to a process used by a host application, such as the computer graphics application.

Another example method includes the following steps: accepting a first signal from a user input device to select a variable displayed in a Graphical User Interface (GUI); accepting a second signal from the user input device to assign the variable to one or more computing resources; and using the one or more computing resources to implement the function that takes as input the variable, wherein the function pertains to a process used by a host application, such as the computer graphics application.

The example method may further include accepting a third signal from a user input device to compile the function, resulting in compiled code; and injecting the compiled encode into a runtime of the host application, whereby modifications may be made to the function and made usable to the host application, without rebooting the host application.

The computing resource may include a processor. The processor may include a Graphics Processing Unit (GPU). The processor may include a Central Processing Unit (CPU). The computing resource may include memory, such as a cache level of memory.

The one or more computing resources may include a local resource. The one or more computing resources may further include a network resource, e.g., a remote database, processor, etc.

The one or more computing resources may further include a cloud computing resource. The cloud computing resource may further include a computing priority tier. The one or more computing resources may further include an evaluator, which may include a process implemented by a plugin to a host application.

Figure 7:
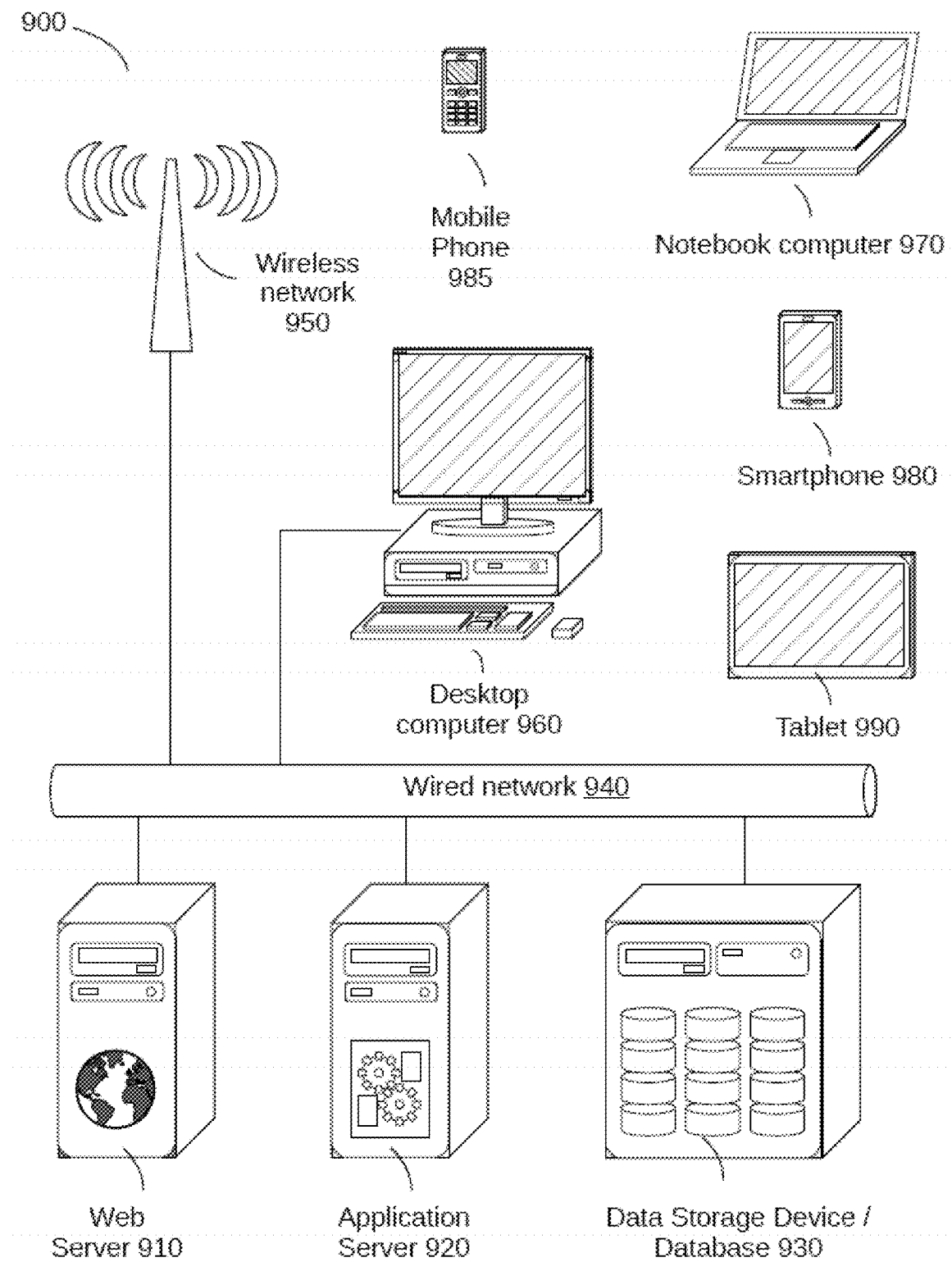
FIG. 7 illustrates a block diagram of an example network environment, which may be used for implementations described herein.

FIG. 7 is a general block diagram of a system 900 and accompanying computing environment usable to implement the implementations of FIGS. 1-6. Implementations may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an implementation, the database 930 includes a relational database that is adapted to store, update, and retrieve data in response to SQL format commands or other database query languages. Other implementations may use unstructured data storage architectures and NoSQL (Not Only SQL) databases.

In an implementation, the application server 920 includes one or more general-purpose computers capable of executing programs or scripts. In an implementation, web server 910 is implemented as an application running on the one or more general-purpose computers. The web server 910 and application server 920 may be combined and executed on the same computers.

An electronic communication network 940-950 enables communication between user computing devices 960-990, web server 910, application server 920, and database 930. In an implementation, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an implementation of the invention. In another implementation, application server 920, web server 910, and optionally database 930 can be combined into a single server computer application and system. In a further implementation, virtualization and virtual machine applications may be used to implement one or more of the application server 920, web server 910, and database 930.

In still further implementations, all or a portion of the web and application serving functions may be integrated into an application running on each of the user computers. For example, a JavaScript application on the user computer may be used to retrieve or analyze data and display portions of the applications.

Figure 8:
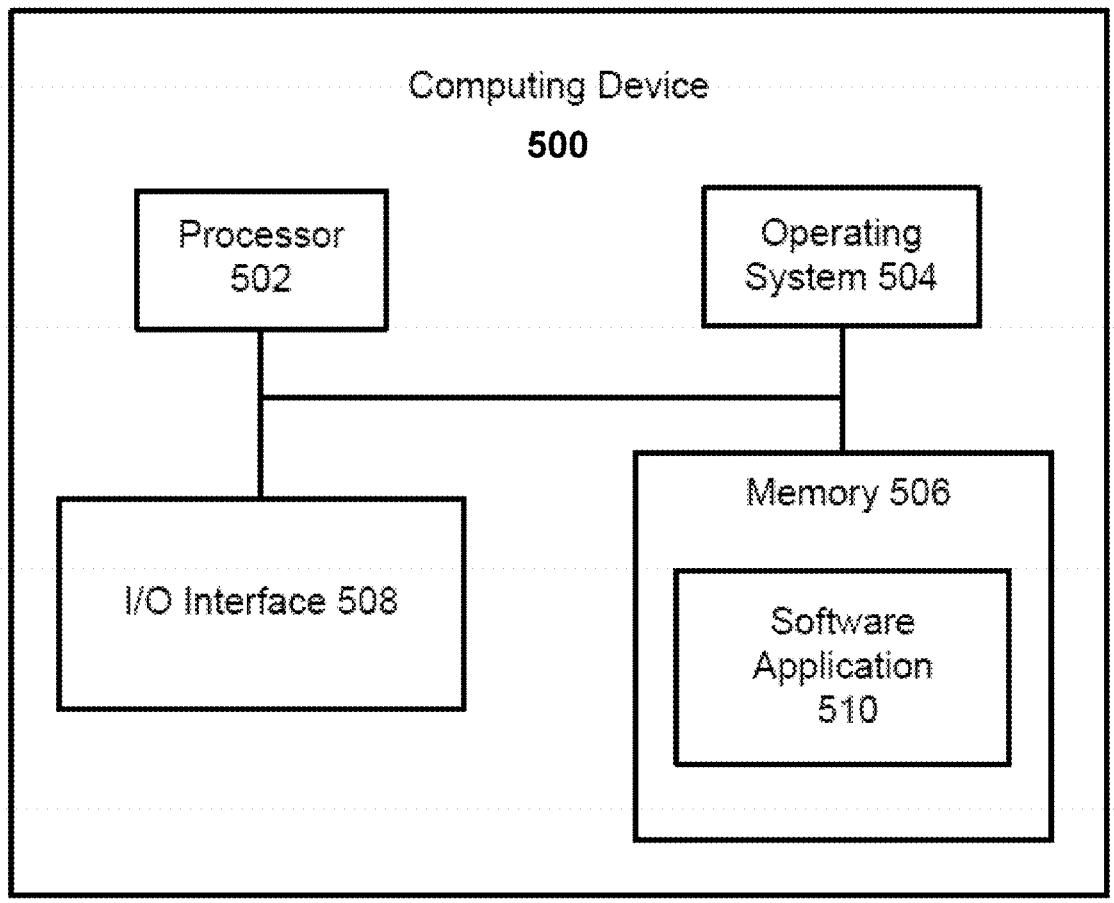
FIG. 8 illustrates a block diagram of an example computing device or system, which may be used for implementations described herein.

FIG. 8 illustrates a block diagram of an example computing device or system 500, which may be used for implementations described herein. For example, the computing device 1000 may be used to implement server devices 910, 920 of FIG. 7 as well as to perform the method implementations described herein. In some implementations, the computing device 1000 may include a processor 1002, an operating system 1004, a memory 1006, and an input/output (I/O) interface 1008.

In various implementations, the processor 1002 may be used to implement various functions and features described herein, as well as to perform the method implementations described herein. While the processor 1002 is described as performing implementations described herein, any suitable component or combination of components of the computing device 1000 or any suitable processor or processors associated with the device 1000 or any suitable system may perform the steps described. Implementations described herein may be carried out on a user device, on a server, or a combination of both.

The example computing device 1000 also includes a software application 1010, which may be stored on memory 1006 or on any other suitable storage location or computer-readable medium. The software application 1010 provides instructions that enable the processor 1002 to perform the functions described herein and other functions. The components of computing device 1000 may be implemented by one or more processors or any combination of hardware devices, as well as any combination of hardware, software, firmware, etc.

For ease of illustration, FIG. 8 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, the computing device 1000 may not have all of the components shown and/or may have other elements including other types of components instead of, or in addition to, those shown herein.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain implementations require at least one of A, at least one of B and at least one of C each to be present.

The use of any and all examples, or exemplary language (e.g., "such as") provided herein, is intended merely to better illuminate implementations of the invention and does not pose a limitation on the scope of the invention unless otherwise claimed. No language in the specification should be construed as indicating any non-claimed element as essential to the practice of the invention.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further implementations can be envisioned to one of ordinary skill in the art after reading this disclosure. In other implementations, combinations or sub-combinations of the above-disclosed invention can be advantageously made. The example arrangements of components are shown for purposes of illustration and it should be understood that combinations, additions, re-arrangements, and the like are contemplated in alternative implementations of the present invention. Thus, while the invention has been described with respect to exemplary implementations, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Although the description has been described with respect to particular implementations thereof, these particular implementations are merely illustrative, and not restrictive. For instance, although features may be described with respect to specific types of resources or operations, e.g., non-volatile memory, the features described herein may be applicable to other cloud computing resources and operations.

Furthermore, while cloud computing is one example of a computing system described, where the memory restoration system may be implemented by a motherboard, the present memory restoration system may be employed in other computing environments in which a memory device or other electronic hardware is updated in the background. For example, network cards, hard drives, etc. may be updated without interfering with currently executing software.

Any suitable programming language can be used to implement the routines of particular implementations including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a computer-readable storage medium for use by or in connection with the instruction execution system, apparatus, system, or device. Particular implementations can be implemented in the form of control logic in software or hardware or a combination of both. The control logic, when executed by one or more processors, may be operable to perform that which is described in particular implementations. For example, a non-transitory medium such as a hardware storage device can be used to store the control logic, which can include executable instructions.

Particular implementations may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular implementations can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A method for executing a function to animate an animation control rig in computer graphics application, the method comprising:
   accepting a first signal from a user input device to select a data structure displayed in a Graphical User Interface (GUI);
   accepting a second signal from the user input device to assign the data structure to one or more computing resources;
   indicating in the GUI that the data structure has been assigned to the one or more computing resources; and
   using the one or more computing resources to implement function's accessing of the data structure by using the one or more computing resources, wherein the function pertains to a process used by a host application, such as the computer graphics application.

2. The method of claim 1, further including:
   accepting a third signal from a user input device to compile the function, resulting in compiled code; and
   injecting the compiled encode into a runtime of the host application, whereby modifications may be made to the function and made usable to the host application, without rebooting the host application.

3. The method of claim 1, wherein a computing resource includes a processor.

4. The method of claim 3, wherein the processor includes a graphics processing unit (GPU).

5. The method of claim 3, wherein the processor includes a central processing unit (CPU).

6. The method of claim 1, wherein a computing resource includes memory.

7. The method of claim 6, wherein the computing resource includes a cache level of memory.

8. The method of claim 1, wherein the one or more computing resources include a local resource.

9. The method of claim 1, wherein the one or more computing resources include a network resource.

10. The method of claim 9, wherein the one or more computing resources includes a cloud computing resource.

11. The method of claim 10, wherein the cloud computing resource includes a computing priority tier.

12. The method of claim 1, wherein the one or more computing resources include an evaluator.

13. The method of claim 12, wherein the evaluator includes a process implemented by a plugin to a host application.

14. The method of claim 13, wherein the host application includes a computer graphics program.

15. The method of claim 14, wherein the computer graphics program includes an animation software program.

16. The method of claim 15, wherein the process implements an operation for affecting an animation control rig in a UI of the animation software program.

17. The method of claim 1, wherein the data structure includes a compound data structure.

18. The method of claim 17, wherein the first UI control represents a user option to assign one or more data structures as one or more arguments for use by one or more GPUs or CPUs in association with the function.

* * * * *